United States Patent [19]

Scott

[11] 4,271,437
[45] Jun. 2, 1981

[54] TIME LAPSE VIDEOTAPE EDITOR/CONTROLLER

[76] Inventor: Xenophon Scott, 2 Whitby Rd., Cherry Hill, N.J. 08003

[21] Appl. No.: 45,969

[22] Filed: Jun. 6, 1979

[51] Int. Cl.³ .................... H04N 5/78; G11B 27/02
[52] U.S. Cl. .................................... 360/9; 360/14; 360/60; 360/74.1
[58] Field of Search ............... 360/9, 35, 14, 33, 60, 360/74.1, 11, 15

[56] References Cited

U.S. PATENT DOCUMENTS

| | | | |
|---|---|---|---|
| 3,463,877 | 8/1969 | Crum | 360/14 |
| 3,974,522 | 8/1976 | Fukatsu | 360/60 |
| 4,001,881 | 1/1977 | Folsom | 360/35 |
| 4,007,490 | 2/1977 | Shoda | 360/11 |
| 4,040,098 | 8/1977 | Beeson | 360/10 |
| 4,115,819 | 9/1978 | Shigeta | 360/14 |

Primary Examiner—John H. Wolff
Assistant Examiner—Alan Faber
Attorney, Agent, or Firm—Robert K. Youtie

[57] ABSTRACT

A time lapse editor/controller for a videotape recorder including a timer to play the recorder at a predetermined frequency, and circuitry responsive to a length of recorder play less than the period of timer frequency to actuate editing by the recorder.

8 Claims, 1 Drawing Figure

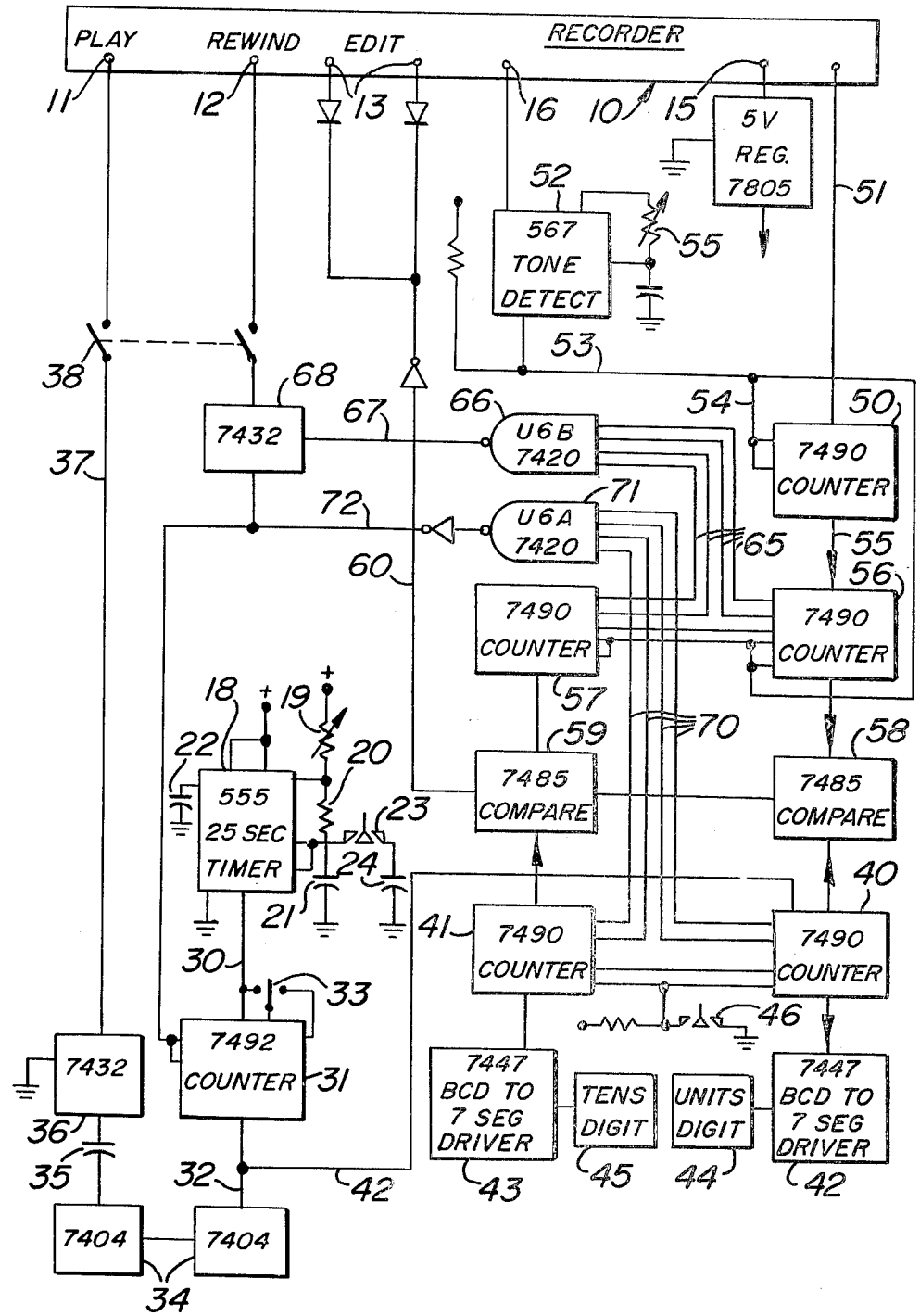

TIME LAPSE VIDEOTAPE EDITOR/CONTROLLER

BACKGROUND OF THE INVENTION

Time lapse recording enables reproduction in less than the actual time period. For example, in reproducing a weather radar picture occurring over an extended period, say twenty-four hours, the recorder is operative to record the radar screen only at spaced time intervals; and, the recordings or takes are successive on the recorder tape for playback in continuous sequence. By way of example, if a videotape recorder was actuated to take or play every five minutes for a period of five seconds then there would be recorded one minute for each hour. Of course, these rates and periods may be selected, as desired.

While there are in the prior art television tape recording apparatus for time-lapse recording, the prior apparatus has been found extremely expensive so that the cost can often not be economically justified, or demanding of considerable manual actuation or operator attention, and unsatisfactory for this reason. Examples of prior art devices capable of time lapse recording are found in the below listed prior U.S. patents, which are not believed of sufficient pertinence to warrant detailed discussion: U.S. Pat. No. 4,100,607 U.S. Pat. No. 3,721,757 U.S. Pat. No. 3,450,832 U.S. Pat. No. 4,007,490 U.S. Pat. No. 3,463,877

SUMMARY OF THE INVENTION

It is an important object of the present invention to provide time lapse recording apparatus for television tape recording which is extremely simple in construction and operation, economic to manufacture and maintain, and durable and reliable throughout a long useful life.

While the apparatus of the present invention has been primarily developed and employed for use in controlling a television tape recorder, as an accessory thereto, and will be illustrated and described hereinafter with particular reference to such embodiment, it is appreciated and intended to be comprehended herein that the instant apparatus may be incorporated in a television tape recorder as original equipment, if desired.

It is a more particular object of the present invention to provide time lapse television tape recording apparatus having the advantageous characteristics mentioned in the preceding paragraphs, wherein electronic circuits automatically generate record or play commands at timed intervals, generate edit commands a predetermined period after each play command, and generate an inhibit command after a predetermined number of play and edit commands.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

The drawing is a schematic representation of the circuitry constituting the instant invention.

DESCRIPTION TO THE PREFERRED EMBODIMENT

Referring now more particularly to the drawing, a recorder is diagrammatically represented at 10, and is of the type including a play command 11, rewind command 12, and edit command 13. The recorder 10 may be conventional, and a Sony BVU-200 cassette recorder has been found satisfactory, although any equivalent recorder equipped for editing may be employed. A voltage source, say a five volt source 15 may be tapped from the recorder, or elsewhere, for use in the controller circuitry. In addition, a tone source 16 is provided, as will appear more fully hereinafter.

A suitable timer or time signal generator is designated 18, and may be a conventional integrated circuit (IC), say a 555 timer may be employed. The timer 18 may be calibrated or set for a predetermined period, say 25 seconds, by suitable external circuitry, such as resistors 19 and 20, and capacitors 21 and 22. For selective rapid advance of the signal of timer 18, there may be provided a normally closed push-button switch 23 and grounded capacitor 24.

The timer 18 passes pulses through conductor 30 to a counter or divider 31 which may be an IC type 7492. The divider or counter 31 emits pulses through conductor 32 in accordance with the division effected of the timer pulses from timer 18. For example, the divider 31 may emit a pulse every 2.5 minutes. If desired, the rate of divider pulse emission may be selected, as by a switch 33, say to emit a pulse every 2.5 minutes or a pulse every 5 minutes, which will determine the rate of recorder sampling. That is, the pulses from divider or counter 31 pass through conductor 32, and series connected invertors 34, which may each be an IC type 7404, passing thence through capacitor 35 and an and gate 36 which may be a 7432 IC. The and gate 36 together with the capacitor 35 are employed as a "one shot" to produce a short pulse upon a change in state signal from the counter or divider 31. The invertors 34 serve to isolate and prevent reflection back from the one shot 36 to the counter/divider 31. The output pulse from the one shot 36 passes through conductor 37 to the play command 11 of the recorder to activate the latter. An on-off switch 38 may be connected in the conductor 37. Thus, at the desired rate of sample recording, the play command of the recorder is energized.

A pair of counters, which may be separate parts of a 7490 IC, as at 40 and 41 serve to count the units digit and tens digit, respectively, of the number of takes or recorder samples initiated. for this purpose, the output of divider or counter 31 may be connected by a conductor 42 to emit the divider pulse to units counter 40, which in turn emits pulses to tens counter 41. The units and tens counters 40 and 41 may be connected, respectively to drivers 42 and 43, and in turn respectively connected to readouts 44 and 45. The drivers may be of suitable IC type, such as 7447. Further the counter means 40, 41 and readout means 44, 45 may be reset, say returned to 0 as by a rest switch switch 46.

Therefore, upon each energization of the recorder play control, the counter means 40, 41 is incremented by one.

The videotape cassette is prepared in advance of recording by prerecording certain suitable information. For example, the videotape cassette may be prerecorded with 20 seconds of color black followed by one minute of color bars and 1,000 Hz tone. The purpose and function of this prerecording will become apparent hereinafter.

An additional counter 50, which may be a 7490 IC is connected by conductor 51 to the recorder 10 to count frame pulses from the tape as recording progresses. By counting frame pulses from the control track, the counter 50 senses the length of each sample recorded. However, the frame pulse counter 50 is disabled until a tone is detected by the tone detector 52 which is connected through a conductor 53 and a conductor 54 to the counter 50 to enable the latter responsive to tone detection. The tone detector 52 is calibrated to detect a selected tone by adjustment of a resistance-capacitance circuit 55.

With the counter 50 enabled by tone detector 52, the counter begins counting frame pulses and may emit a corresponding count pulse, say corresponding to every 5 frames or other desired duration of take or recording sample. That is, the end of a take or recording sample is indicated by each pulse emitted from counter 50, which pulses are directed by conductor 55 to the decade or units and tens counters 56 and 57. The count of completed takes or samples, as counted by counters 56 and 57 is compared to the count of initiated takes or samples counted by counters 40 and 41 by means of magnitude comparators 58 and 59. The counters 56 and 57 may each be a 7490 IC, and the comparators 58 and 59 may each be a 7485 IC.

Whenever the number of completed takes or samples, from the take counter of counters 56 and 57 equals the number of initiated takes or samples from the take number of counters 40 and 41, an edit command signal is generated by the comparators 58 and 59 and transmitted, as by conductor 60 to edit control 13. The duration of each sample is determined by the division rate of the frame pulse divider/counter 50.

The total length of time lapse recording is therefore determined by the total number of takes counted. When the total number of completed takes reaches a predetermined amount, say 99 in the illustrated embodiment, the take counters 56 and 57 communicate, as through conductors 65, to a nand gate 66, which may be a 7420 IC. By the gate 66, through conductor 67, an and gate 68 is pulsed to effect rewinding of the recorder tape. However, if the take number of counters 40, 41 is also 99, an inhibit signal is passed through conductors 70 to a nand gate 71 which inhibits both rewinding and subsequent play commands, as by conductor 72 to both and gate 7432 and counter-divider 31. This prevents the recorder from rewinding and upon resetting of the counter to destroy the previously made recording. Rather, the recorder will stay in record and continue real time recording operation.

From the foregoing, it is seen that the present invention provides a time lapse videotape recording apparatus and editor/controller which are extremely simple in construction and operation and otherwise fully accomplish their intended objects.

Although the present invention has been described in some detail by way of illustration and example for purposes of clarity of understanding, it is understood that certain changes and modifications may be made within the spirit of the invention.

What is claimed is:

1. A time lapse videotape editor/controller for a recorder having play, rewind, and edit controls; comprising timer means for connection to the play control to energize the latter at a desired frequency of sampling cycles; first counter means for counting the number of beginnings of sampling cycles effected by energizing of said play control; second counter means for repeatedly indicating a desired length of sample to be recorded; said desired sample length being shorter than the period of said frequency; third counter means for counting the number of said desired sample lengths subsequent to each cycle beginning; comparitor means for comparing said first and third counter means and adapted to connection to the edit control of the recorder to operate the latter when the count of said third counter means equals a predetermined relation to that of said first counter means; and rewind control operating means for connection between said third counter and rewind control effecting rewind to the beginning of the tape responsive to a predetermined count of sample lengths subsequent to each cycle beginning, whereby a tape is rewound to await energizing of said play control responsive to said first timer means and initiate editing for the sample length when the tape passes previously edited samples plus one sample.

2. A time lapse videotape editor/controller according to claim 1, said rewind control operating means comprising a gate circuit responsive to said third counter means.

3. A time lapse videotape editor/controller according to claim 1, in combination with an inhibit circuit operative to inhibit said play control, and inhibit circuit operating means connected to said first counter means for inhibiting said play control when said rewind control has been operated.

4. A time lapse videotape editor/controller according to claim 3, said inhibit circuit comprising a gate circuit responsive to said first counter means.

5. A time lapse videotape editor/controller according to claim 1, said second counter means comprising pulse counting means for counting frame pulses from a tape control track.

6. A time lapse videotape editor/controller according to claim 1, in combination with an inhibit circuit operative to inhibit said play control connected to one of said counter means for inhibiting said play control when a predetermined number of samples has been recorded.

7. A time lapse videotape editor/controller according to claim 6, said inhibit circuit being adapted for connection to said rewind control.

8. A time lapse videotape editor/controller according to claim 1, in combination with detector means connected to said second counter means for enabling the latter responsive to a predetermined signal, whereby a desired sample length is not indicated until a signal is detected by said detector.

* * * * *